US012594614B2

(12) United States Patent
Vila Gonzalez et al.

(10) Patent No.: US 12,594,614 B2
(45) Date of Patent: Apr. 7, 2026

(54) RIBBON SAW WITH DOUBLE SECURITY SYSTEM

(71) Applicant: EQUIPAMIENTOS CARNICOS, S.L., Barcelona (ES)

(72) Inventors: Luis Vila Gonzalez, Barcelona (ES); Jordi Vila Gonzalez, Barcelona (ES)

(73) Assignee: EQUIPAMIENTOS CARNICOS, S.L., Barcelona (ES)

( * ) Notice: Subject to any disclaimer, the term of this patent is extended or adjusted under 35 U.S.C. 154(b) by 135 days.

(21) Appl. No.: 18/585,560

(22) Filed: Feb. 23, 2024

(65) Prior Publication Data

US 2024/0300041 A1 Sep. 12, 2024

(30) Foreign Application Priority Data

Mar. 9, 2023 (EP) ..................................... 23382224

(51) Int. Cl.
| | |
|---|---|
| *B23D 59/00* | (2006.01) |
| *A22C 17/00* | (2006.01) |
| *B23D 55/06* | (2006.01) |
| *B27B 13/14* | (2006.01) |

(52) U.S. Cl.
CPC ........ *B23D 59/001* (2013.01); *A22C 17/0033* (2013.01); *B23D 55/065* (2013.01); *B27B 13/14* (2013.01)

(58) Field of Classification Search
CPC ...... B23D 59/00; B23D 59/001; B23D 55/06; B23D 55/065; B27B 13/14
See application file for complete search history.

(56) References Cited

U.S. PATENT DOCUMENTS

| | | | | | |
|---|---|---|---|---|---|
| 5,272,946 | A | * 12/1993 | McCullough | ........... | B27B 13/14 83/788 |
| 8,919,231 | B2 | * 12/2014 | Butler | .................. | B23D 45/067 83/72 |
| 2001/0049988 | A1 | * 12/2001 | Ushiwata | ............. | B23D 59/003 83/520 |
| 2002/0170400 | A1 | * 11/2002 | Gass | ...................... | B27G 21/00 83/788 |
| 2002/0190581 | A1 | * 12/2002 | Gass | ...................... | B27B 13/14 307/326 |
| 2008/0245200 | A1 | * 10/2008 | Campbell | .............. | B27G 19/06 83/13 |
| 2010/0180739 | A1 | * 7/2010 | Gass | .................. | B23Q 11/0082 83/788 |
| 2014/0290455 | A1 | * 10/2014 | Gass | ...................... | F16P 3/148 83/62.1 |

(Continued)

*Primary Examiner* — Boyer D Ashley
*Assistant Examiner* — Richard D Crosby, Jr.
(74) *Attorney, Agent, or Firm* — MaxGoLaw PLLC

(57) ABSTRACT

A ribbon saw with a double security system is provided that includes a cutting ribbon (3), vertically installed between an upper part (1a) and a lower part (1b) with driving mechanism and control electronics. The control electronics include a first artificial vision security system, with a camera (5) and a second magnetic artificial vision security system, with an inductive sensor or metal detector (6) installed on the table (4), in front of the cutting ribbon (3). The security system is connected to one or two braking systems (14,15) based on a disc (14) and a pneumatic clamp (15) that stops the mechanism of pulleys (12a, 12b) of the ribbon (3), when it detects the color and the metallic or ferrous material of the gloves that the operator wears.

9 Claims, 2 Drawing Sheets

(56) References Cited

U.S. PATENT DOCUMENTS

| | | | |
|---|---|---|---|
| 2019/0143550 A1* | 5/2019 | Stolzer | B23D 53/00 |
| | | | 83/39 |
| 2019/0145577 A1* | 5/2019 | Blenkinsopp | F16P 3/142 |
| | | | 83/58 |
| 2019/0202083 A1* | 7/2019 | Shmueli | F16P 3/142 |

\* cited by examiner

RIBBON SAW WITH DOUBLE SECURITY SYSTEM

OBJECT OF THE INVENTION

The invention, as stated in the title of this specification, refers to a ribbon saw with double security system contributing to the function to which it is designed, with advantages and characteristics that are disclosed in detail thereafter and that means an improvement to the current state-of-the-art.

The object of this invention refers to a ribbon saw or band saw of the type that, for example, is used in the meat industry to cut pieces, but without other fields are discarded, which is distinguished in that, in addition to a first security system based on one or more artificial vision cameras that stop the saw when they detect the gloves of a predetermined color that the user must wear, it likewise comprises a second security system based on, at least, an inductive sensor or metal detector that stops the saw when it detects metallic elements included in the gloves or detectable metal nitrile gloves, such as those produced by the company Detectamet, providing the advantage of stopping the saw even when the user's hand wearing glove remains hidden under the piece of meat to be cut and without it is required that the user has to be connected to the machine. In parallel, the saw object of the invention possesses, preferably, a braking system by means of disc and pneumatic clamp in one or both pulleys of the ribbon saw that remains protected and far away the cutting area, without directly acting on the ribbon, so that it provides more reliability and hygiene than the braking systems currently used in this type of ribbon saw in which the cutting ribbon that is in contact with the product is braked.

FIELD OF APPLICATION OF THE INVENTION

The field of application of this invention is within the sector of the food industry engaged in manufacturing industrial cutting machinery, namely focusing on the field of the saws, more concretely the ribbon saws or band saws and their security systems.

BACKGROUND OF THE INVENTION

Ribbons saws of the type herein involved having artificial vision are known. In fact, in the market, several manufacturers of saws with artificial vision exist. They are cameras (one or more) installed in vertical position on the saw cutting area, focusing downwards and above the cutting ribbon.

The problem with these cameras, that stop the saw when they detect the blue color of the gloves the user must wear, is that they only detect the said gloves when they are in front, above or behind the piece of meat or bone to be cut, that means, they only detect the gloves that the camera can directly see. Therefore, that system does not protect the fingers of the users that can be located under the piece and, therefore, hidden from the vision of the camera, which is a risk, because it can occur that, to hold or move the piece the operator, inadvertently, places some finger under it.

To overcome this problem, some manufacturers incorporate, as security means, gloves that connect by means of a physical cable to the saw machine, so that they electrically detect and stop the saw before the contact with them.

However, this is an awkward solution that can fail if the operator, for any reason, forgets to connect the gloves to the machine, something he shall have to do every time he has to move to carry out any other task and come back to the saw. It can be awkward and little practical.

In turn, another of the problems of the ribbon saws currently existing in the market is located in the braking system because, normally, it is based in systems that act directly on the ribbon, with which being located within the cutting area that can affect the hygiene of the machine and, in addition, their effectiveness shall directly depend on the state of the ribbon and whether the product to be cut is greasy or not.

It is known US2018243848 that relates to a ribbon saw with a monitoring and safety system that utilizes vision and sensors designed to provide user feedback on safety and training, but not comprising a magnetic security system and not comprising a braking system as it is disclosed in the present patent application.

The objective of this invention therefore is, on the one hand, to provide the market with a new security system for the ribbon saws that, added to the artificial vision, allows to prevent the problems of hiding the fingers under the piece to be cut and, in addition, does not mean a system uncomfortable for the user and, on the other hand, a fully reliable and hygienic braking system that does not depend on the state of the ribbon and of the product being cut.

On the other hand, and as reference to the current state-of-the-art, it shall be mentioned that, at least the applicant is not aware of the existence of any other ribbon saw with double security system that presents technical and constitutive characteristics same or similar to those the herein claimed.

EXPLANATION OF THE INVENTION

The ribbon saw with double security system that the invention proposes is configured as the optimum solution to the above-mentioned objective, the characterizing details making it possible and that duly distinguish it appearing in the final claims attached to this description.

Concretely, what the invention proposes, as it was said before, is a ribbon saw or a band saw, of the type that, for example, is used in the meat or fish industry for cutting pieces, but without other fields are discarded, that is essentially distinguished by the fact that, in addition to a first security system based on one or more artificial vision cameras that trigger a braking system that stops the saw when they detect the gloves of a predetermined color, normally blue, that the user must wear, likewise comprises a second security system based on, at least, an inductive sensor or metal detector that also triggers the security system that stops the saw when it detects metallic elements that shall have been provided in the glove or when it detects nitrile blue gloves that, as those commercialized by the company Detectamet, are also metal detectable, providing the advantage of stopping the saw even when the user's hand wearing a glove or some of his fingers, normally the thumb, remains hidden under the piece of meat to be cut and without it is required that the user has to be connected to the machine.

More concretely, the ribbon saw object of the invention is a machine of those that, essentially, comprises a structure having an upper part that defines a recess where is located, in such a way it remains protected, a part of the mechanism of pulleys that moves the saw, and a lower part that defines a second recess with the other part of the mechanism of pulleys and the means driving it, normally an electric motor as well as the control electronics, on which an horizontal surface that constitutes the table where the product to be cut is located, and a ribbon or band with cutting teeth on one of its sides vertically located between the pulleys of the upper part and the lower part of the structure, so that, when triggering it and quickly moving with a continuous travel, it cuts the product that is pushed through it.

In addition, the machine possesses, also in a known manner, with a first security system constituted by, at least, an image capturing camera installed on its upper part, so that it captures the image of the cutting area and is connected to the control electronics so that, when it detects a given pre-established color, normally electric blue, of the gloves the operator is wearing, a braking system is automatically triggered that instantly stops the cutting ribbon action.

Starting from the said already know configuration, the cutting saw object of this invention is a machine that, in addition, comprises a second security system, in this case a magnetic system that comprises, at least, an inductive sensor or metal detector installed on the cutting table, just ahead of the cutting ribbon, which is able to detect a metal detectable glove that passes above the sensor at a few centimeters and, in that case, also automatically trigger the braking system that stops the cutting ribbon in a few milliseconds.

Preferably, the said sensor is an inductive sensor or metal detector having a rectangular configuration that is arranged, hygienically encapsulated, flush to the cutting table, so that it encompasses a portion of the area prior to the cutting ribbon, with which the easiness of the cutting operations is assured provided that the operator uses a glove of the detectable color and with metallic elements detectable by the inductive sensor.

In addition, preferably, the inductive sensor or metal detector is installed on a tilting anchorage so that the said anchorage allows that it is easily taken apart to change the ribbon.

With this, if the operator, instead of ordinary blue gloves, uses special gloves of blue color and metallically detectable such as those produced by the company Detectamet (that are a type of gloves of nitrile that already exists in the market and are homologated by the food industry) that glove will be detected by the inductive sensor or metal detector even though it remains hidden under the piece to be cut and thus the operator will have full protection against cuts, because the said inductive sensor or metal detector is also connected to the control electronics that regulates the actuation of the cutting ribbon and of the braking system thereof in order that, when detecting the said metal detectable glove, the braking system is automatically triggered that will stop its movement.

On its hand, the said braking system that, preferably, the ribbon saw object of this invention possesses, instead of acting directly on the cutting ribbon, is an indirect system, that means, that it does not apply the braking to the ribbon, for which it is based, essentially, in one or two discs and one or two pneumatic clamps and it remains protected inside a wraparound casing of the recess of the lower and/or upper part of the machine and, therefore, completely away from the cutting area, which makes that the application of the braking is fully hygienic and, in addition, the effectiveness does not depend on the state of the ribbon or whether the product to be cut is greasy or not, which can worsen the braking condition, as it occurs with the formerly known systems. In the system of the saw braking of this invention, the braking conditions between disc (and) the lining of the pads of the clamp remain constant and hygienic.

More specifically, the braking system that the ribbon saw of the invention incorporates comprises, basically, a pneumatic clamp that, connected to the control electronics, acts on a brake disc that, in turn, is located intercalated between the driving wheel and the lower pulley that moves the said wheel to procure the travel of the ribbon, a driving wheel that, in turn, triggers the electric motor to which it is indirectly linked through a transmission. For a best braking response, in an option of embodiment of the saw, this later in addition incorporates a second braking system identical to the former in the upper pulley but the disc, directly installed on the axis of the said upper pulley shaft, which acts at the same time as the lower braking system improving the braking time.

Preferably, for safety reasons, the clamp of the brake has a negative actuation, that means, lacking air pressure, it is always closed, braking at the maximum power provided to it by the clamp spring itself. The pneumatic pressure is used to open the clamp, with which, facing any failure of pressure in the pneumatic circuit or compressor, the machine would stop.

Preferably, in the lower braking system, the joint between the disc and the driving wheel is direct, as they are mounted on the same shaft. This way, the disc stop by means of the clamp, is exactly translated into the same stop of the driving wheel which is the one that, through the lower pulley to which it is connected, drags the ribbon. On its part, in the upper braking system, the disc is integral with the wheel of the upper pulley.

Complementarily and in an opposite way, there exists a transmission and spacing of shafts between the motor shaft and the above-mentioned wheel-disc shaft as well, in addition, a torque limiter in the driven wheel disc shaft/pulley driven of the transmission, so that, correctly set, it helps to reduce the charge of inertia in the brake disc, apart from unbinding it from the inertia of the motor rotor.

Thus, by placing the above described inductive sensor or rectangular and tilting metal detector just in front of the cutting ribbon and the described ribbon braking system, the saw of the invention provides a protection and hygiene higher than any other saw of those currently existing in the market that only includes the artificial vision system and a direct braking system on the ribbon, as well as a protection that allows a much easier use of the machine, as it does not require that the operator is connected with any belt nor any other connection to the machine, and can work with totally free movements.

The inductive sensor or metal detector will detect the detectable metal gloves that will pass above it, at least at a given maximum height, that will be equal to the capacity of detection of the sensor, anyway much before this later gets closer to the ribbon.

This detection with inductive sensor or metal detector is almost as effective as the security system of the upper artificial vision camera and, anyway it is complemented with it.

In addition, the inductive detector or metal detector detects and acts in an area of detection that, preferably, encompasses around 10 cm of length before the cutting ribbon and protects from a height of at least 2 cm from the table.

The comfort of using gloves that are not connected with cables to any belt and to the machine is also an important advantage.

DESCRIPTION OF THE DRAWINGS

To complement the description being carried out and in order to assist to best understand the characteristics of the invention, attached to this specification, as an integral part thereof, there is a drawing in which, for illustration and no limitation purpose, the following has been represented:

The FIG. 1.—It shows a schematic side elevation view of an example of embodiment of the ribbon saw with double security system object of the invention, the main parts and elements it comprises can be seen, as well as the configuration and arrangement thereof;

Figures 1, 2:
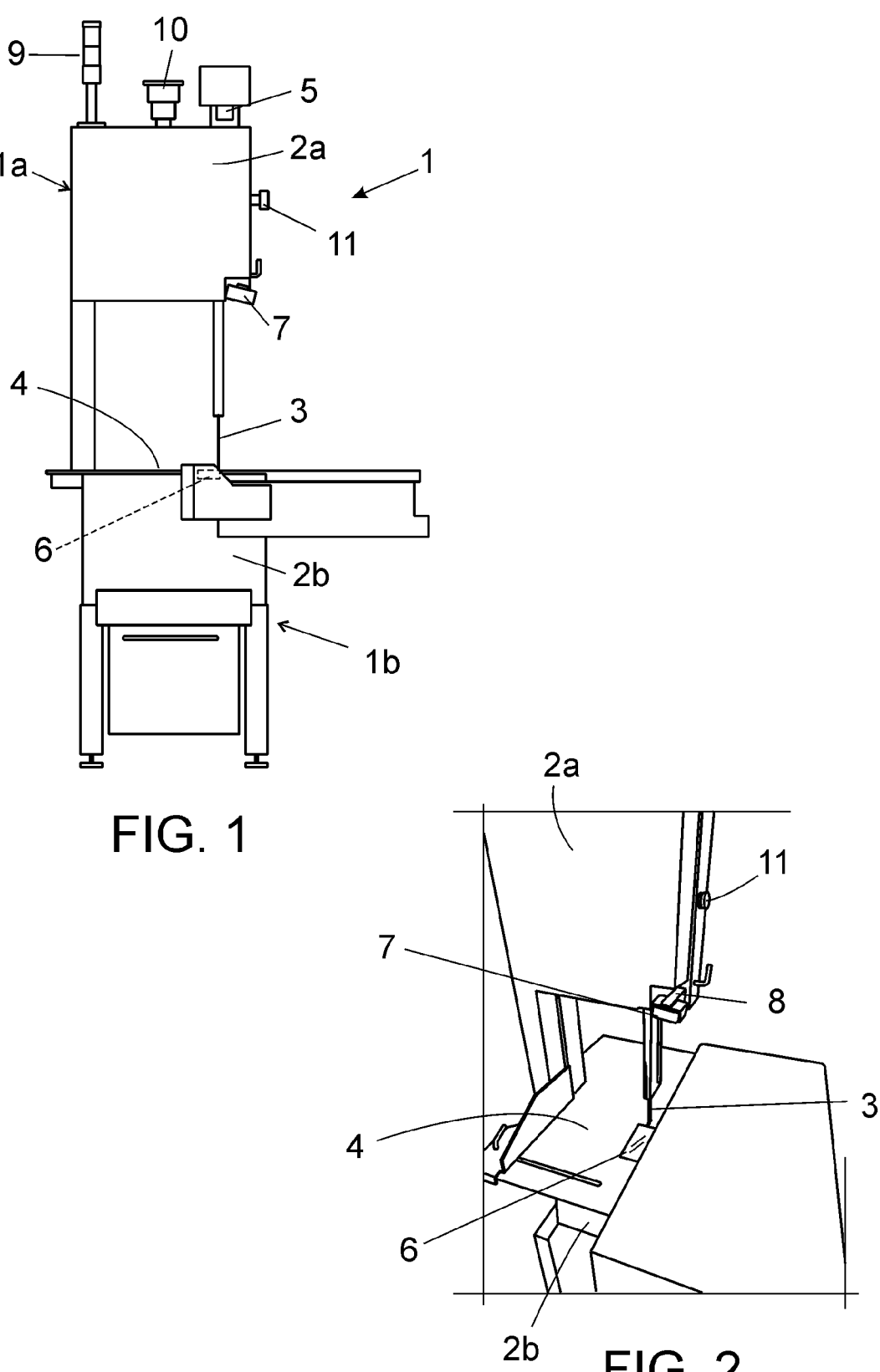
Figure 3:
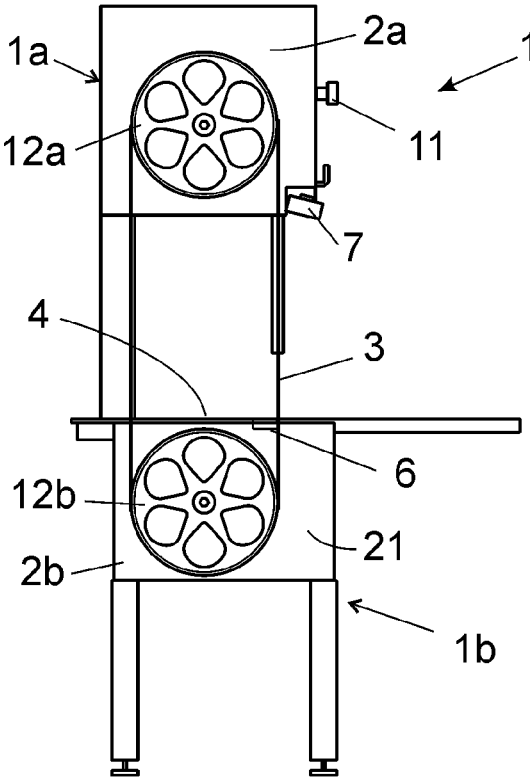
Figure 4:
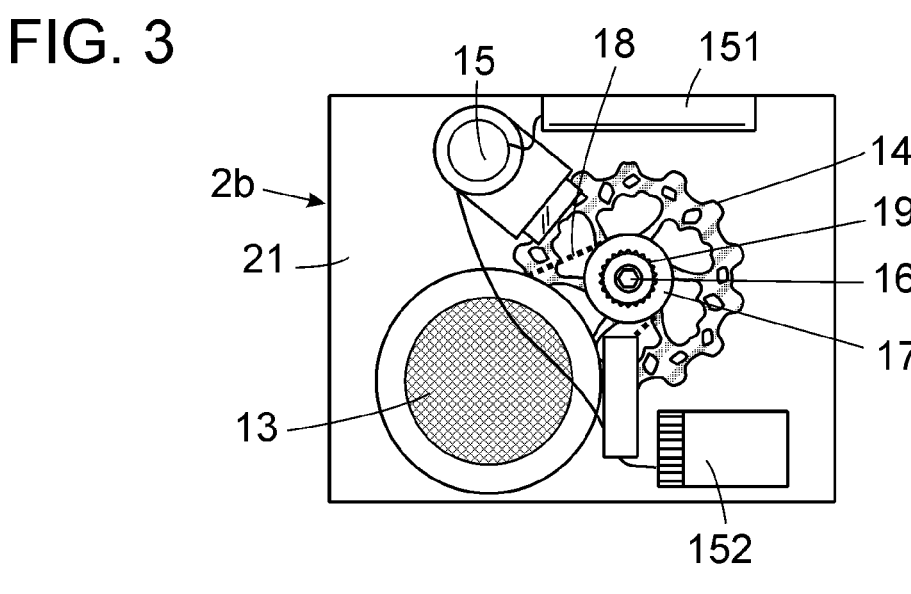

the FIG. 2.—It shows a top perspective view of a portion of the example of the ribbon saw shown in the FIG. 1, the cutting table can be seen in this case with the ribbon where the inductive sensor or metal detector is located;

the FIG. 3.—It shows a schematic side elevation view and section of the saw of the invention, where the system of pulleys has been represented that moves the ribbon; and ribbon (3) from the said front side (1c); and the FIG. 4—It shows a schematic of the mechanism inside a housing provided behind a wall (21) of the recess (2b) of the lower part (1b) of the structure of the machine (1).

In addition, the machine (1) possesses a first artificial vision security system that comprises, at least, a camera (5) for capturing image installed at the upper part (1a) of the structure, on the recess (2a) thereof, oriented towards the table (4) and so that it captures the image of the ribbon (3) cutting area, the said camera (5) being connected to the control electronics in order that, when it detects an element of a given predetermined color, preferably blue color, the color of the gloves that the operator will wear, braking means (14/15) will be automatically triggered that stops the cutting ribbon (3) drive in a few milliseconds.

From the said already known configuration, the machine (1) that constitutes the ribbon saw object of this invention is distinguished in that it comprises a second magnetic security system that, in turn, comprises, at least, an inductive sensor or metal detector (6) installed on the table (4), just ahead of the cutting ribbon (3) exposed part, connected to the control electronics in order that, when remotely detecting and without contact the presence on it of detectable metal blue gloves the operator will wear, at least the braking system (14/15) is automatically triggered that stops the cutting ribbon (3) drive in a few milliseconds.

Preferably, the inductive sensor or metal detector (6) that the machine (1) comprises has a rectangular configuration hygienically encapsulated flush to the table (4) surface.

Preferably, the inductive sensor or metal detector (6) is incorporated to the table (4) by means of a tilting anchorage (not appearing in the figures) that allows to withdraw it without dismounting it to easily have access to the cutting ribbon (3) and to proceed to replacing it every time it is convenient.

On its part, the braking means that the machine (1) possesses and that act as well by what is detected by the camera (5) of the artificial vision system as by the inductive sensor or metal detector (6) of the magnetic security system, comprise at least an indirect braking system that, instead of on the ribbon (3), acts on the means that trigger the mechanism of pulleys (12a, 12b), comprising a disc (14) associated to the mechanism of pulleys (12a, 12b) and a pneumatic clamp (15) that remains protected and separated from the said mechanism inside a housing provided behind a wall (21) of the recess (2b) of the lower part (1b) of the structure of the machine.

Preferably, the at least one braking system comprises, basically, a pneumatic clamp (15) that, connected to the control electronics, acts on a brake disc (14) that, in turn, is intercalated on a common shaft (16) between the driving wheel (17) and the lower pulley (12b) that moves the said wheel (17), the said driving wheel (17) being linked to the electric motor (13) that drives it, preferably, in this case, through a transmission (18).

Preferably, as best seen in FIG. 4, the brake clamp (15), conveniently connected to a fluid deposit (151) and to a compressor (152), has a negative performance, that means, lacking air pressure, it is always close, and the pneumatic pressure is used for opening it, so that, facing any failure of pressure in the pneumatic circuit or compressor, it is closed and brakes the disc (14) that, in turn, stops the mechanism that moves the ribbon (3).

Preferably, the joint between the disc (14) and the driving wheel (17) is direct, as they are mounted on a same shaft (16).

Preferably, in addition to the transmission (18) and spacing of shafts between the motor shaft (13) and the shaft (16) of the wheel-disc, the existence of a torque limiter (19) is provided on the shaft (16) (and) wheel-disc (17/14) driven of the transmission (18) that helps to reduce the charge of inertia on the brake disc (14), apart from unbinding it from the inertia of the motor (13) rotor.

And, although it was not represented in the figures as it is very similar to that represented in the FIG. 4, in a preferred embodiment of the invention, the machine (1) comprises, under the recess (2a) of the upper part (1a) of the structure, a second braking system that also comprises a pneumatic clamp (15) that, connected to the control electronics, acts on a brake disc (14) that, in turn, is fixed integral with the shaft of the lower pulley (12a), the brake clamp (15) being conveniently connected to a fluid deposit (151) and to a compressor (152).

On the other hand, in a preferred embodiment of the invention, the machine (1) comprises, under the said recess (2a) of the upper part (1a) of the structure, just on the area where the cutting ribbon (3) emerges, a light (7) or spotlight to provide a greatest accurateness in the capture of image of the camera (5), the light (7) of which, preferably, is incorporated on an orientable support (8).

In addition, in a preferred embodiment of the machine (1), on the top part (1a) of the structure, the existence has been provided of an indicator light device (9) with both indicator lights, red and green, of the state of operation of the machine, as well as a ribbon (10) tightening device and an emergency stop push-button (11).

Sufficiently disclosed the nature of this invention, as well as the manner of implementing it, it is not deemed necessary to extend anymore its explanation in order that any person skilled in the art understands its extends and the advantages arising from it.

The invention claimed is:

1. A ribbon saw with double security system coupled to a machine (1) and comprising a cutting ribbon (3), vertically coupled to an upper pulley (12a) within an upper housing (1a) having an upper recess (2a) and a lower pully (12b) within a lower housing (1b) having a lower recess (2b), with an electric motor (13) within the lower recess (2b) connected to an electronic control, the electric motor (13) linked to a driving wheel (17) through a transmission (18) and a lower braking system connected to the electronic control having a pneumatic clamp (15) that acts on a brake disc (14) located intercalated on a common shaft (16) between the driving wheel (17) mechanically coupled to the lower pulley (12b), an artificial vision security system that comprises, at least, a camera (5) installed on the upper housing (1a) and oriented towards a table (4) which is defined at the top of the lower housing (1b) so that it captures an image of an area including the cutting ribbon (3), the camera (5) being connected to the electronic control to trigger the lower braking system and stop the cutting ribbon (3) when the camera (5) detects a predetermined color of gloves worn by an operator of the machine (1), and comprising a magnetic security system that, in turn, comprises, at least, a detector (6) installed on the table (4), just in front of the cutting ribbon (3), said detector being connected to the electronic control in order that at least the lower braking system is automatically triggered and stops the cutting ribbon (3) when the detector (6) remotely detects without contact, the presence of metal detectable blue gloves worn by the operator of the machine (1) and characterized in that the lower braking system of the double security system is triggered by what is detected by the camera (5) of the artificial vision security system and is also triggered by the detector (6) of the magnetic security system.

2. The ribbon saw according to the claim 1, characterized in the detector (6) installed on the table (4) is an inductive sensor or a metal detector.

3. The ribbon saw according to the claim 2, characterized in that the inductive sensor or metal detector has a rectangular configuration.

4. The ribbon saw according to the claim 1, characterized in that the detector (6) is installed on the table (4) and is tiltable to allow unencumbered access to the cutting ribbon (3) to service or replace the cutting ribbon (3) without uninstalling the detector (6).

5. The ribbon saw according to the claim 1, characterized in that the pneumatic clamp (15) remains closed by default and requires pneumatic pressure to open.

6. The ribbon saw according to the claim 1, further comprising a torque limiter (19) on the common shaft (16).

7. The ribbon saw according to claim 1, further comprising an upper braking system within the upper recess (2a) connected to the electronic control and having a pneumatic clamp (15) that acts on a brake disc (14) fixed integral with the shaft of the upper pulley (12a), the pneumatic clamp (15) being conveniently connected to a fluid deposit (151) and to a compressor (152).

8. The ribbon saw according to claim 1, characterized in that it comprises, on the upper housing (1a) of the structure, just above the area where the cutting ribbon (3) emerges, a light (7) incorporated on an orientable support (8).

9. The ribbon saw according to claim 1, further comprising an indicator light device (9) having both green and red indicator lights to indicate the state of operation of the machine (1).

* * * * *